(12) United States Patent
Shin et al.

(10) Patent No.: US 11,024,216 B2
(45) Date of Patent: Jun. 1, 2021

(54) DISPLAY SUBSTRATE AND DISPLAY DEVICE INCLUDING THE SAME

(71) Applicant: SAMSUNG DISPLAY CO., LTD., Yongin-si (KR)

(72) Inventors: Hye-Jin Shin, Cheonan-si (KR); Won-Kyu Kwak, Seongnam-si (KR); Kwang-Min Kim, Seoul (KR)

(73) Assignee: SAMSUNG DISPLAY CO., LTD., Yongin (KR)

( * ) Notice: Subject to any disclaimer, the term of this patent is extended or adjusted under 35 U.S.C. 154(b) by 0 days.

(21) Appl. No.: 16/790,943

(22) Filed: Feb. 14, 2020

(65) Prior Publication Data

US 2020/0184878 A1 Jun. 11, 2020

Related U.S. Application Data

(63) Continuation of application No. 16/196,393, filed on Nov. 20, 2018, now Pat. No. 10,593,254, which is a (Continued)

(30) Foreign Application Priority Data

Feb. 2, 2015 (KR) ........................ 10-2015-0015945

(51) Int. Cl.
*G09G 3/20* (2006.01)
*G02F 1/1345* (2006.01)
(Continued)

(52) U.S. Cl.
CPC ......... *G09G 3/2092* (2013.01); *G02F 1/1333* (2013.01); *G02F 1/13454* (2013.01);
(Continued)

(58) Field of Classification Search
CPC ...... G09G 3/36; G09G 3/2092; G09G 3/2088; G09G 2300/0426; G09G 2300/0439;
(Continued)

(56) References Cited

U.S. PATENT DOCUMENTS

| 8,638,280 B2 | 1/2014 | Nonaka |
| 10,157,565 B2 | 12/2018 | Shin et al. |

(Continued)

FOREIGN PATENT DOCUMENTS

| JP | 2008-292995 | 12/2008 |
| KR | 10-2004-0064625 | 7/2004 |

(Continued)

OTHER PUBLICATIONS

Korean Office Action dated Apr. 19, 2021 issued in corresponding Korean Patent Application No. 10-2015-0015945.

*Primary Examiner* — Robert J Michaud
(74) *Attorney, Agent, or Firm* — F. Chau & Associates, LLC

(57) ABSTRACT

A display substrate and a display device including the display substrate are disclosed. In one aspect, the display substrate includes a plurality of pixels formed in a substantially circular pixel area and a driving circuit formed in a peripheral area surrounding the pixel area and configured to drive the pixels. A boundary is formed between the pixel area and the peripheral area, and the boundary is substantially concentric with respect to an arc defining the substantially circular pixel area. The driving circuit comprises a conductive pattern having a first side which extends in a peripheral direction crossing the boundary.

13 Claims, 11 Drawing Sheets

Related U.S. Application Data continuation of application No. 14/807,785, filed on Jul. 23, 2015, now Pat. No. 10,157,565.

(51) Int. Cl.
*G02F 1/1333* (2006.01)
*G09G 3/36* (2006.01)

(52) U.S. Cl.
CPC ........ *G02F 1/1345* (2013.01); *G02F 2201/56* (2013.01); *G09G 3/3611* (2013.01); *G09G 2300/0426* (2013.01); *G09G 2310/0202* (2013.01); *G09G 2310/0281* (2013.01)

(58) Field of Classification Search
CPC .... G09G 2310/0281; G09G 2310/0283; G02F 1/1333; G02F 1/13306; G02F 1/13454
See application file for complete search history.

(56) References Cited

U.S. PATENT DOCUMENTS

| | | |
|---|---|---|
| 2014/0253419 A1 | 9/2014 | Tanada |
| 2015/0355487 A1* | 12/2015 | Emmert .............. G02F 1/13454 349/33 |
| 2016/0225306 A1 | 8/2016 | Shin et al. |
| 2019/0088191 A1 | 3/2019 | Shin et al. |

FOREIGN PATENT DOCUMENTS

| | | |
|---|---|---|
| KR | 10-2012-0004119 | 1/2012 |
| KR | 10-1301918 | 8/2013 |
| KR | 10-2014-0033914 | 3/2014 |
| KR | 10-2014-0109261 | 9/2014 |

* cited by examiner

DISPLAY SUBSTRATE AND DISPLAY DEVICE INCLUDING THE SAME

CROSS REFERENCE TO RELATED APPLICATIONS

This application is a continuation of U.S. application Ser. No. 16/196,393, filed on Nov. 20, 2018, which is a continuation of U.S. application Ser. No. 14/807,785, filed on Jul. 23, 2015, now U.S. Pat. No. 10,157,565 issued on Dec. 18, 2018, which claims priority under 35 U.S.C. § 119 to Korean Patent Application No. 10-2015-0015945, filed on Feb. 2, 2015, in the Korean Intellectual Property Office, the disclosures of which are incorporated by reference herein in their entireties.

BACKGROUND

Field

The described technology generally relates to a display substrate and a display device including the same.

Description of the Related Technology

Cathode ray tube (CRT) displays are typically large and non-portable, but flat panel displays such as, liquid crystal displays and organic light-emitting diode (OLED) displays can be made relatively small, lightweight and to consume low power.

A display device usually includes a display substrate having a quadranglular shape. The display device includes a pixel area and a peripheral area surrounding the pixel area. A plurality of pixels to display an image, thin film transistors (TFTs) to control the pixels and signal lines to provide signals to the pixels are formed in the pixel area. A driving portion to drive the pixels including a peripheral TFT is formed in the peripheral area.

SUMMARY OF CERTAIN INVENTIVE ASPECTS

One inventive aspect relates to a display substrate that can improve efficiency of a circuit layout in a peripheral area and a display device having the display substrate.

Another aspect is circular display substrate and a display device including the same.

Another aspect is a method of displaying an image using the display device.

Another aspect is a circular display substrate that includes a plurality of pixels formed in a pixel area having a circular shape, and a driving portion formed in a peripheral area adjacent to the pixel area, and configured to drive the pixels. The driving portion includes a conductive pattern having a first side which extends in a perpendicular direction to a boundary of the pixel area and the peripheral area.

In example embodiments, the driving portion includes a plurality of scan circuits. The scan circuit can include a first pattern electrically connected to the pixel and having a first side and a second side. The first side of the first pattern can extend in the perpendicular direction to the boundary. The second side of first pattern can extend in a direction substantially perpendicular to the first side.

In example embodiments, the circular display substrate further includes a scan line formed in the pixel area and electrically connecting the scan circuit to the pixel. The scan line can extend in a first direction. An angle between an extending direction of the first side of the first pattern and the first direction can be varied according to a position of the scan circuit.

In example embodiments, the scan line and the first pattern of the scan circuit are formed from a same conductive layer.

In example embodiments, the driving portion further includes a plurality of data circuits. The data circuit can include a second pattern electrically connected to the pixel and having a first side and a second side. The first side of the second pattern can extend in the perpendicular direction to the boundary. The second side of second pattern can extend in a direction substantially perpendicular to the first side.

In example embodiments, the circular display substrate further includes a data line formed in the pixel area and electrically connecting the data circuit to the pixel. The data line can extend in a second direction which is substantially perpendicular to the first direction. An angle between an extending direction of the first side of the second pattern and the second direction can be varied according to a position of the data circuit.

In example embodiments, the data line and the second pattern of the data circuit are formed form a same conductive layer.

In example embodiments, a distance between the scan circuit and the data circuit which is adjacent to the scan circuit gets smaller as being closer to the boundary.

In example embodiments, a distance between the scan circuit and the boundary is smaller than a distance between the data circuit and the boundary. The scan circuits and the data circuits can be arranged in two rows in a plan view.

In example embodiments, the circular display substrate further includes a scan connecting line formed between the scan circuit and the scan line and configured to electrically connect the scan line to the scan circuit. The scan connecting line can extend in the perpendicular direction to the boundary.

In example embodiments, the length of each of the scan connecting line is substantially same as each other regardless of a position of the scan circuit.

In example embodiments, two scan circuits which are formed adjacent to each other are spaced apart from each other in a same distance.

In example embodiments, the scan circuit is connected to the pixel which is near the peripheral area by a conductive pattern having a leaner shape.

In example embodiments, the peripheral area has a ring shape surrounding the pixel area.

Another aspect is a display device that includes a circular display panel including a circular display substrate and a receiving container configured to receiving the circular display panel. The circular display substrate includes a plurality of pixels formed in a pixel area having a circular shape, and a driving portion formed in a peripheral area adjacent to the pixel area, and configured to drive the pixels. The driving portion includes a conductive pattern having a first side which extends in a perpendicular direction to a boundary of the pixel area and the peripheral area.

In example embodiments, the driving portion of the circular display substrate includes a plurality of scan circuits. The scan circuit can include a first pattern electrically connected to the pixel and having a first side and a second side. The first side of the first pattern can extend in the perpendicular direction to the boundary. The second side of first pattern can extend in a direction substantially perpendicular to the first side.

In example embodiments, the circular display substrate is formed in the pixel area, and further includes a scan line formed in the pixel area and electrically connecting the scan circuit to the pixel. The scan line can extend in a first direction. An angle between an extending direction of the first side of the first pattern and the first direction can be varied according to a position of the scan circuit.

In example embodiments, the receiving container includes an upper receiving container and a lower receiving container. The upper receiving container can overlap the peripheral area of the circular display substrate.

Another aspect is a circular display substrate that includes a plurality of pixels formed in a pixel area having a circular shape, and a driving portion formed in a peripheral area adjacent to the pixel area, and configured to drive the pixels. The driving portion includes a plurality of unit circuits repeatedly formed along the peripheral area. A layout of each of the unit circuits extends toward a center of the pixel area.

In example embodiments, the distances between each of the unit circuit and the center of the pixel area are substantially uniform.

Another aspect is a display substrate comprising: a plurality of pixels formed in a substantially circular pixel area; and a driving circuit formed in a peripheral area surrounding the pixel area and configured to drive the pixels, wherein a boundary is formed between the pixel area and the peripheral area, and wherein the boundary is substantially concentric with respect to an arc defining the substantially circular pixel area, wherein the driving circuit comprises a conductive pattern having a first side which extends in a peripheral direction crossing the boundary.

In the above display substrate, the driving circuit comprises a plurality of scan circuits, wherein each scan circuit comprises a first pattern electrically connected to a selected pixel and has first and second sides connected to each other, wherein the first side of the first pattern extends in the peripheral direction, and wherein the second side of first pattern extends in an arc direction crossing the first side.

The above display substrate further comprises a scan line formed in the pixel area, wherein the scan line is configured to electrically connect a selected scan circuit to the selected pixel, wherein the scan line extends in a first direction, and wherein an angle between the peripheral direction and the first direction varies with respect to the position of the selected scan circuit.

In the above display substrate, the scan line and the first pattern are formed on the same layer.

In the above display substrate, the driving circuit further comprises a plurality of data circuits, wherein each of the data circuits comprises a second pattern electrically connected to a selected pixel and has first and second sides connected to each other, wherein the first side of the second pattern extends in the peripheral direction, and wherein the second side of second pattern extends in the arc direction.

The above display substrate further comprises a data line formed in the pixel area, wherein the scan line is configured to electrically connect a selected data circuit to the selected pixel, wherein the data line extends in a second direction crossing the first direction, and wherein an angle between the peripheral direction and the second direction varies with respect to the position of the selected data circuit.

In the above display substrate, the data line and the second pattern are formed on the same layer.

In the above display substrate, the distance between the selected scan circuit and a selected data circuit adjacent to the selected scan circuit is smaller at a location closer to the boundary.

In the above display substrate, the distance between the selected scan circuit and the boundary is less than the distance between a selected data circuit adjacent to the selected scan circuit and the boundary, wherein the scan circuits and the data circuits are arranged in rows.

The above display substrate further comprises a scan connecting line formed between each of the scan circuits and the scan line and configured to electrically connect the scan line to the scan circuit, wherein the scan connecting line extends in the peripheral direction.

In the above display substrate, the scan connecting line comprises a plurality of scan connecting lines having lengths substantially the same as each other.

In the above display substrate, the distances between adjacent scan circuits are substantially the same.

The above display substrate further comprises a conductive pattern configured to electrically connect a selected scan circuit to the selected pixel adjacent to the peripheral area, wherein the conductive pattern has a shorter width than that of the selected scan circuit.

In the above display substrate, the peripheral area forms a ring around the pixel area.

Another aspect is a display device, comprising: a display panel comprising a substantially circular display substrate and a receiving container configured to receive the display panel, wherein the substantially circular display substrate comprises: a plurality of pixels formed in a substantially circular pixel area; and a driving circuit formed in a peripheral area surrounding the pixel area and configured to drive the pixels, wherein a boundary is formed between the pixel area and the peripheral area, and wherein the boundary is substantially concentric with respect to an arc defining the substantially circular pixel area, wherein the driving circuit comprises a conductive pattern having a first side which extends in a peripheral direction crossing the boundary.

In the above display device, the driving circuit comprises a plurality of scan circuits, wherein each scan circuit comprises a first pattern electrically connected to a selected pixel and has first and second sides connected to each other, wherein the first side of the first pattern extends in the peripheral direction, and wherein the second side of first pattern extends in an direction crossing the first side.

In the above display device, the circular display substrate is formed in the pixel area, wherein the display device further comprises a scan line formed in the pixel area, wherein the scan line is configured to electrically connect a selected the scan circuit to the pixel, wherein the scan line extends in a first direction, and wherein an angle between the peripheral direction and the first direction varies with respect to the position of the selected scan circuit.

In the above display device, the receiving container comprises upper and lower receiving containers, wherein the upper receiving container overlaps the peripheral area of the substantially circular display substrate.

Another aspect is a display substrate comprising: a plurality of pixels formed in a substantially circular pixel area; and a driving circuit formed in a peripheral area surrounding the pixel area and configured to drive the pixels, wherein the driving circuit comprises a plurality of unit circuits surrounding the pixel area, and wherein each of the unit circuits extends toward the center of the pixel area.

In the above display substrate, the distances between each of the unit circuits and the center of the pixel area are substantially the same.

According to at least one of the disclosed embodiments, unit circuits of a circular display substrate arranged along the boundary of a pixel area and a peripheral area extends in a perpendicular direction to the boundary. Thus, efficiency of a circuit layout in peripheral area can be improved.

In addition, resistive load due to a wiring length difference can be reduced.

DETAILED DESCRIPTION OF CERTAIN INVENTIVE EMBODIMENTS

Recently, demand for a display device having a circular substrate has increased. The circular display device has a pixel arrangement different from a typical display device, such that a new layout of a peripheral area is required. In typical displays, the arrangement of circuitry of the driving portion is not efficient.

Hereinafter, the described technology will be explained in detail with reference to the accompanying drawings. In this disclosure, the term "substantially" includes the meanings of completely, almost completely or to any significant degree under some applications and in accordance with those skilled in the art. Moreover, "formed on" can also mean "formed over." The term "connected" can include an electrical connection.

Figure 1:
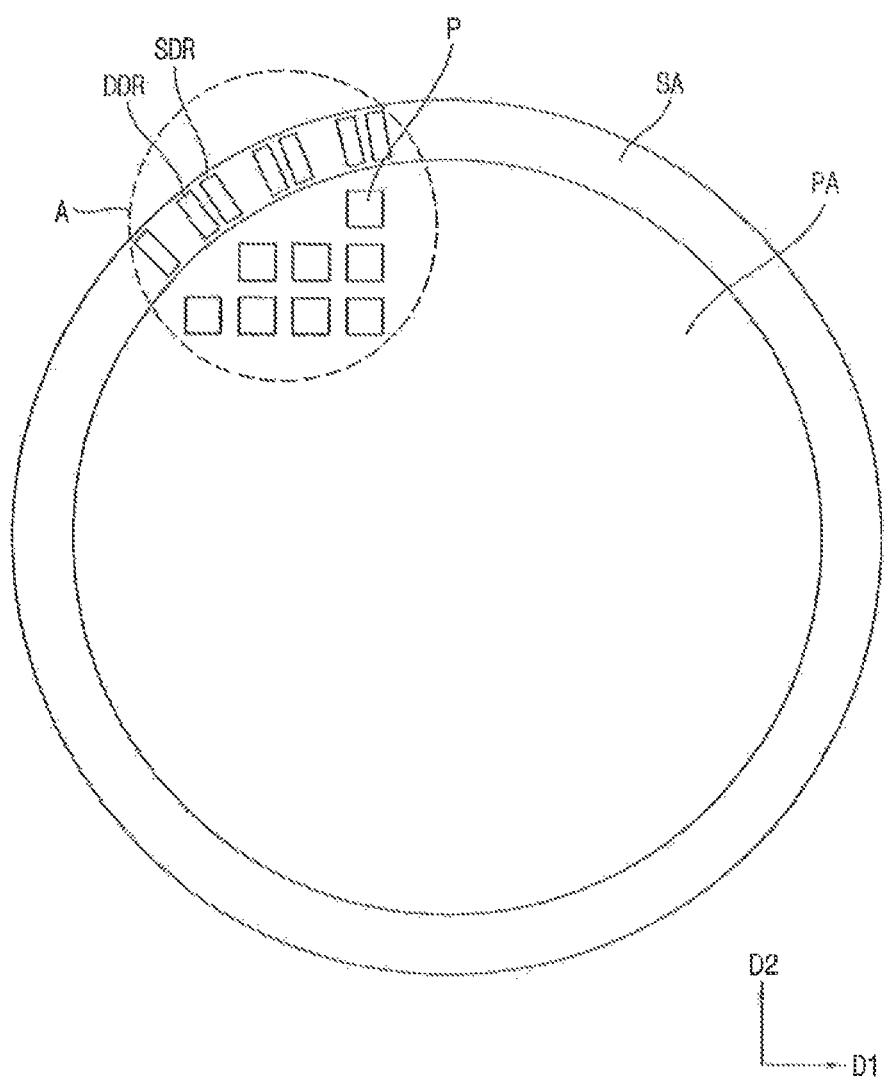
FIG. 1 is a plan view illustrating a circular display substrate according to an exemplary embodiment.
Figure 2:
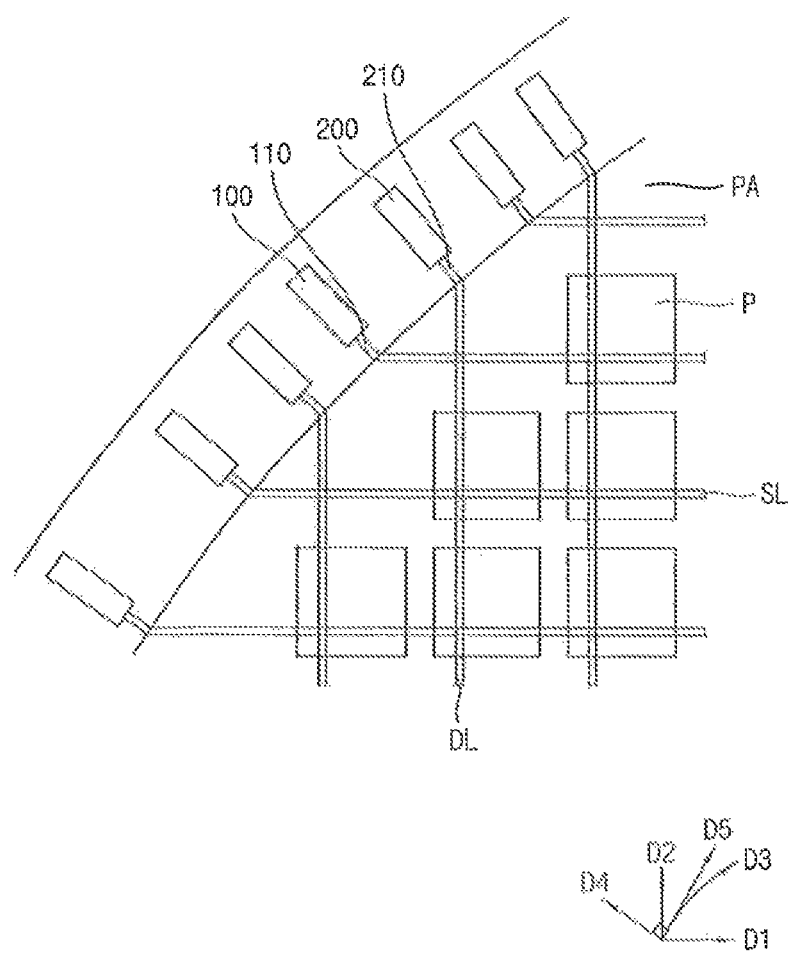
FIG. 2 is an enlarged view illustrating A area of FIG. 1.

FIG. 1 is a plan view illustrating a circular display substrate according to an exemplary embodiment. FIG. 2 is an enlarged view illustrating A area of FIG. 1.

Referring to FIGS. 1 and 2, a circular display substrate includes a pixel area PA and a peripheral area SA.

The circular display substrate can display an image in the pixel area PA. For example, the circular display substrate is a liquid crystal display substrate, an OLED display substrate and the like.

The pixel area PA has a substantially circular shape. The pixel area PA includes a plurality of pixels P to display an image. The pixels P can be arranged in a matrix form along a first direction D1 and a second direction D2 in the pixel area PA. The second direction D2 crosses the first direction D1. The pixel P is electrically connected to a scan line SL and a data line DL. The scan line SL extends in the first direction D1. The data line DL extends in the second direction D2 to cross the first direction D1.

The peripheral area SA is adjacent to the pixel area PA. The peripheral area SA can surround the pixel area PA, so that can form a ring. A driving portion to drive the pixels P is formed in the peripheral area SA.

The driving portion (or driving circuit) includes a scan driving portion (or scan driving circuit) SDR and a data driving portion (or data driving circuit) DDR. The scan driving portion SDR sequentially provides scan signals to the pixels P. The data driving portion DDR provides data signals to the pixels P. The scan driving portion SDR includes a plurality of scan circuits 100. The data driving portion DDR include a plurality of data circuits 200.

The scan circuit 100 is formed in the peripheral area SA. The scan circuit 100 is electrically connected to the scan line SL in the pixel area PA through a scan connecting line 110 which is formed in the peripheral area SA.

The data circuit 200 is formed in the peripheral area SA. The data circuit 200 is electrically connected to the data line DL in the pixel area PA through a data connecting line 210 which is formed in the peripheral area SA.

Referring again to FIG. 2, a boundary between the pixel area PA and the peripheral area SA is substantially circular. Thus, a portion of the boundary has an arc shape. The boundary is formed along an arc direction D3, and the scan circuits 100 and the data circuits 200 are formed in the arc direction D3. For example, the scan circuits 100 and the data circuits 200 are alternately formed along the arc direction D3.

The scan circuit 100 extends in a fourth direction (or peripheral direction) D4 which is substantially perpendicular to or crossing the arc direction D3. The fourth direction D4 is substantially perpendicular to the arc direction D3, so that the fourth direction D4 can be varied according to a position of the scan circuit 100. For example, the scan circuit 100 overall has a width in a fifth direction D5 which is substantially perpendicular to the fourth direction D4, and extend in the fourth direction D4, so that the scan circuit 100 is substantially rectangular.

The scan connecting line 110 is formed in the peripheral area SA. The scan connecting line 110 electrically connects the scan circuit 100 to the scan line SL in the pixel area PA. The scan connecting line 110 extends in the fourth direction D4. Thus, the scan connecting line 110 extends in a direction which is substantially perpendicular to the boundary between the pixel area PA and the peripheral area SA.

The data circuit 200 extends in the fourth direction D4 which is substantially perpendicular to the arc direction D3. The fourth direction D4 is substantially perpendicular to the arc direction D3, so that the fourth direction D4 can be varied according to a position of the data circuit 200. For example, the data circuit 200 has a width in a fifth direction D5, and extend in the fourth direction D4, so that the data circuit 200 has a substantially rectangular shape.

The data connecting line 210 is formed in the peripheral area SA. The data connecting line 210 electrically connects the data circuit 200 to the data line DL in the pixel area PA. The data connecting line 210 extends in the fourth direction D4. Thus, the data connecting line 210 extends in a direction which is perpendicular to the boundary of the pixel area PA and the peripheral area SA.

Accordingly, the scan circuits 100 and the data circuits 200 are formed along the boundary of the pixel area PA and the peripheral area SA, and each of the scan circuits 100 and the data circuits 200 extends in a substantially perpendicular direction to the boundary. Thus, efficiency of a circuit layout in peripheral area SA can be improved.

In addition, the scan connecting line 110 extends in the perpendicular direction to the boundary, so that the scan lines SL in the pixel area PA and the scan circuits 100 can be connected to each other substantially uniformly. Thus, resistive load due to a wiring length difference can be reduced.

In addition, the data connecting line 210 extends in the perpendicular direction to the boundary, so that the data lines DL in the pixel area PA and the data circuits 200 can be connected to each other substantially uniformly. Thus, resistive load due to a wiring length difference can be reduced.

Figure 3A:
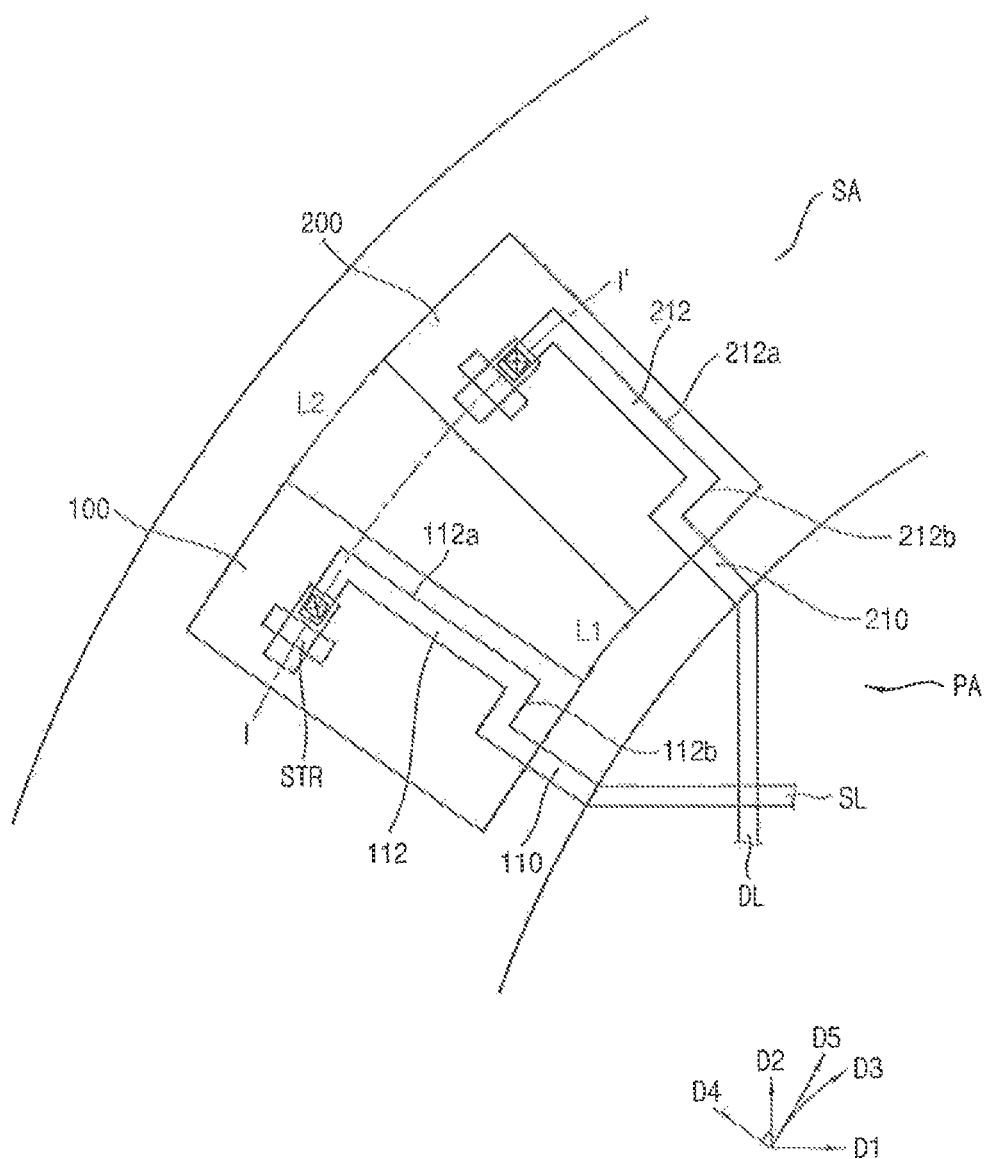
FIG. 3A is a partially enlarged view illustrating a scan circuit and a data circuit of FIG. 2.
Figure 3B:
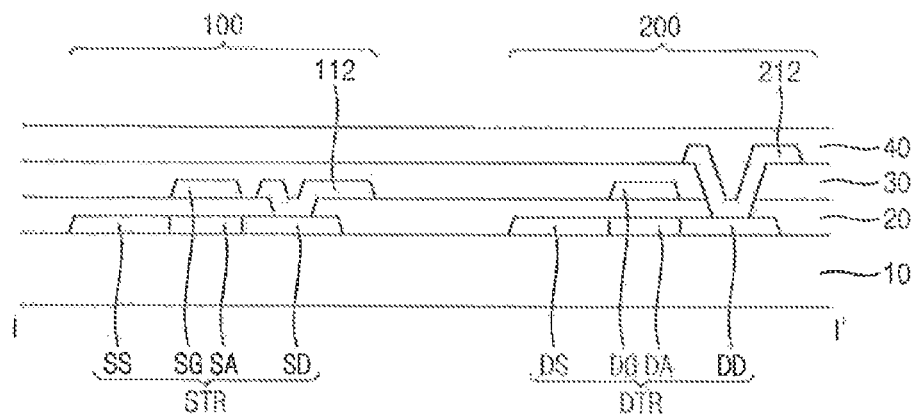
FIG. 3B is a cross-sectional view taken along line I-I' of FIG. 3A.

FIG. 3A is a partially enlarged view illustrating a scan circuit and a data circuit of FIG. 2. FIG. 3B is a cross-sectional view taken along line I-I' of FIG. 3A.

Referring to FIGS. 3A and 3B, the scan circuit 100 includes a scan peripheral transistor STR and a first pattern 112. The data circuit 200 includes a data peripheral transistor DTR and a second pattern 212.

The circular display substrate includes a base substrate 10, an active pattern, a first insulation layer 20, a gate metal pattern, a second insulation layer 30, a data metal pattern and a third insulation layer 40.

The base substrate 10 can include a transparent insulation substrate. For example, the base substrate 10 includes a glass substrate, a quartz substrate, a transparent resin substrate, etc. Examples of the transparent resin substrate for the base substrate 10 include polyimide-based resin, acryl-based resin, polyacrylate-based resin, polycarbonate-based resin, polyether-based resin, sulfonic acid containing resin, polyethyleneterephthalate-based resin, etc.

Although not shown in figure, at least one buffer layer can be formed on the base substrate 10. For example, the buffer layer prevents diffusion of metal atoms and/or impurities from the base substrate 10. Additionally, the buffer layer can adjust heat transfer rate of a successive crystallization process for the active pattern, to thereby obtain a substantially uniform active pattern. When the base substrate 10 has a relatively irregular surface, the buffer layer can improve flatness of the surface of the base substrate 10. The buffer layer can be formed of a silicon compound. For example, the buffer layer includes silicon oxide (SiOx), silicon nitride (SiNx), silicon oxynitride (SiOxNy), silicon oxycarbide (SiOxCy), silicon carbon nitride (SiCxNy), etc. These can be used alone or in a mixture thereof.

The active pattern is formed on the base substrate 10. In one example embodiment, the active pattern is formed of silicon (Si). In another example embodiment, the active pattern includes a semiconductor oxide including a binary compound (ABx), a ternary compound (ABxCy) and/or a quaternary compound (ABxCyDz). For example, the active pattern is formed of indium (In), zinc (Zn), gallium (Ga), Tin (Sn), titanium (Ti), aluminum (Al), hafnium (HI), zirconium (Zr) and/or magnesium (Mg).

The active pattern can include a scan peripheral active area SA, a scan peripheral source area SS and a scan peripheral drain area SI) of the scan peripheral transistor STR. In addition, the active pattern can include a data peripheral active area DA, a data peripheral source area DS and a data peripheral drain area DD of the data peripheral transistor DTR.

The first insulation layer 20 can be formed on and cover the active pattern. The first insulation layer 20 can be formed by a CVD process, a spin coating process, a plasma enhanced chemical vapor deposition (PECVD) process, a sputtering process, a vacuum deposition process, a high density plasma-chemical vapor deposition (HDP-CVD) process, printing process, etc. For example, the first insulation layer 20 is formed of silicon oxide (SiOx), silicon nitride (SiNx), silicon oxynitride (SiOxNy), aluminum oxide (AlOx), tantalum oxide (TaOx), hafnium oxide (HfOx), zirconium oxide (ZrOx), titanium oxide (TiOx), etc. These can be used alone or in a combination thereof. In addition, the first insulation layer 20 can have a single layer structure or a multi layer structure formed of silicon oxide and/or silicon nitride. In example embodiments, the first insulation layer 20 are substantially uniformly formed on the base substrate 10 along a profile of the active pattern. Here, the first insulation layer 20 can have a substantially small thickness, such that a stepped portion can be generated at a portion of the first insulation layer 20 adjacent to the active pattern. In some example embodiments, the first insulation layer 20 has a relatively large thickness for sufficiently covering the active pattern, so that the first insulation layer 20 has a substantially level surface.

The gate metal pattern includes the scan line SL in the pixel area (referring to PA of FIG. 2), the scan connecting line 110 in the peripheral area SA, the first pattern 112 of the scan circuit 100, a scan peripheral gate electrode DG of the scan peripheral transistor STR, and a data peripheral gate electrode DG of the data peripheral transistor DTR.

The gate metal pattern can be formed on the first insulation layer 20. In some example embodiments, a conductive layer (not illustrated) is formed on the first insulation layer 20, and then the conductive layer is partially etched by a photolithography process or an etching process using an additional etching mask. Hence, the gate metal pattern can be provided on the first insulation layer 20. The conductive layer can be formed by a printing process, a sputtering process, a CVD process, a pulsed laser deposition (PLD) process, a vacuum evaporation process, an atomic layer deposition (ALD) process, etc. The gate metal pattern can be formed of metal, alloy, conductive metal oxide, a transparent conductive material, etc. For example, the gate metal pattern is formed of aluminum (Al), alloy containing aluminum, aluminum nitride (AlNx), silver (Ag), alloy containing silver, tungsten (W), tungsten nitride (WNx), copper (Cu), alloy containing copper, nickel (Ni), alloy containing nickel, chrome (Cr), chrome nitride (CrNx), molybdenum (Mo), alloy containing molybdenum, titanium (Ti), titanium nitride (TiNx), platinum (Pt), tantalum (Ta), tantalum nitride (TaNx), neodymium (Nd), scandium (Sc), strontium ruthenium oxide (SRO), zinc oxide (ZnOx), indium tin oxide (ITO), tin oxide (SnOx), indium oxide (InOx), gallium oxide (GaOx), indium zinc oxide (IZO), etc. These can be used alone or in a combination thereof. In example embodiments, the gate metal layer has a single layer structure or a multi layer structure, which can include a metal film, an alloy film, a metal nitride film, a conductive metal oxide film and/or a transparent conductive film.

The scan line SL is electrically connected to the pixels (refers to P of FIG. 2) in the pixel area.

The first pattern 112 is formed in the peripheral area, and includes a portion of the scan circuit 110. For example, the first pattern 112 is electrically connected to the scan drain area SD of the scan peripheral transistor STR through a contact hole formed through the first insulation layer 20.

The first pattern includes a first side 112a which extends in a fourth direction D4 and a second side 112b which extends in a fifth direction D5 which is substantially perpendicular to the fourth direction D4. The fourth direction D4 is substantially perpendicular to a boundary of the pixel area and the peripheral area. Thus, the scan circuit 100 includes a circuit pattern having sides which extend along the fourth direction D4 and the fifth direction D5. Accordingly, the scan circuit 100 can be substantially rectangular.

The scan connecting line 110 is formed in the peripheral area, and electrically connects the first pattern 112 of the scan circuit 100 to the scan line SL. The scan connecting line 110 extends in the fourth direction D4 which is substantially perpendicular to the boundary.

The scan peripheral gate electrode SG overlaps the scan peripheral active area SA. The scan peripheral active area SA, the scan peripheral source area SS and the scan peripheral drain area SD are included in the scan peripheral transistor STR.

The data peripheral gate electrode DG overlaps the data peripheral active area DA. The data peripheral active area DA, the data peripheral source area DS and the data peripheral drain area DD are included in the data peripheral transistor DTR.

Thus, the scan line SL in the pixel area and the first pattern 112 in the peripheral area, the scan peripheral gate electrode SG of the scan peripheral transistor STR, and the data peripheral gate electrode DG of the data peripheral transistor DTR can be formed from the same metal layer by patterning the metal later.

The second insulation layer 30 is formed on the first insulation layer 20 on which the gate pattern is formed. The second insulation layer 30 having a substantially uniform thickness can be formed on the first insulation layer 20 along a profile of the gate metal pattern. Thus, a stepped portion can be generated at a portion of second insulation layer 30 adjacent to the gate metal pattern. The second insulation layer 30 can be formed using a silicon compound. For example, the second insulation layer 30 is formed of silicon oxide, silicon nitride, silicon oxynitride, silicon oxycarbide and/or silicon carbon nitride. These can be used alone or in a mixture thereof. The second insulation layer 30 can be obtained by a spin coating process, a CVD process, a PECVD process, an HDP-CVD process, an LPCVD process, etc. In example embodiments, the second insulation layer 30 has a single layer structure or a multi layer structure, which includes a silicon oxide film, a silicon nitride film, a silicon oxynitride film, a silicon oxycarbide film and/or a silicon carbon nitride film.

The data metal pattern is formed on the second insulation layer 30.

The data metal pattern includes a data line DL in the pixel area, data connecting line 210 in the peripheral area, and the second pattern 212 of the data circuit 200.

In one example embodiment, a conductive layer (not illustrated) is formed on the second insulation layer 30, and then the conductive layer is partially etched by a photolithography process or an etching process using an additional etching mask. Hence, the data metal pattern can be provided on the second insulation layer 30. The conductive layer can be formed by a printing process, a sputtering process, a CVD process, a pulsed laser deposition (PLD) process, a vacuum evaporation process, an atomic layer deposition (ALD) process, etc. The data metal pattern can be formed of metal, alloy, conductive metal oxide, a transparent conductive material, etc. For example, the data metal pattern is formed of aluminum (Al), alloy containing aluminum, aluminum nitride (AlNx), silver (Ag), alloy containing silver, tungsten (W), tungsten nitride (WNx), copper (Cu), alloy containing copper, nickel (Ni), alloy containing nickel, chrome (Cr), chrome nitride (CrNx), molybdenum (Mo), alloy containing molybdenum, titanium (Ti), titanium nitride (TiNx), platinum (Pt), tantalum (Ta), tantalum nitride (TaNx), neodymium (Nd), scandium (Sc), strontium ruthenium oxide (SRO), zinc oxide (ZnOx), indium tin oxide (ITO), tin oxide (SnOx), indium oxide (InOx), gallium oxide (GaOx), indium zinc oxide (IZO), etc. These can be used alone or in a combination thereof. In example embodiments, the data metal layer has a single layer structure or a multi layer structure, which includes a metal film, an alloy film, a metal nitride film, a conductive metal oxide film and/or a transparent conductive film.

The data line DL is electrically connected to the pixel in the pixel area.

The second pattern 212 is formed in the peripheral area and is included in a portion of the data circuit 200. For example, the second pattern 212 is electrically connected to the data drain area DD of the data peripheral transistor DTR through a contact hole formed through the first and second insulation layers 20 and 30.

The second pattern 212 includes a first side 212a which extends along a fourth direction D4 and a second side 212b which extends in a fifth direction D5 which is substantially perpendicular to the fourth direction D4. The fourth direction D4 is substantially perpendicular to a boundary between the pixel area and the peripheral area. Thus, the data circuit 200 includes a circuit pattern having sides which extend along the fourth direction D4 and the fifth direction D5. Accordingly, the data circuit 200 can be substantially rectangular.

The data connecting line 210 is formed in the peripheral area, and electrically connects the second pattern 212 of the data circuit 200 to the data line DL. The data connecting line 210 extends in the fourth direction D4 which is substantially perpendicular to the boundary. The data connecting line 210 can have substantially the same length as the scan connecting line 110, so that the data circuit 200 and the scan circuit 100 can be located at substantially the same distance from the boundary between the pixel area and the peripheral area.

A distance between the data circuit 200 and the scan circuit 100 which is adjacent to the data circuit 200 is less as the data circuit 200 is closer to the pixel area. Thus, a first distance L1 between the data circuit 200 and the scan circuit 100 close to the pixel area is less than a second distance L2 between the data circuit 200 and the scan circuit 100 far from the pixel area.

The data line DL and the second pattern 212 can be formed from the same metal layer by patterning the same metal layer.

The third insulation layer 40 is formed on the second insulation layer 30 on which the data pattern is formed.

The third insulation layer 40 can have a single-layered structure or a multi-layered structure including at least two insulation films. In example embodiments, a planarization process is executed on the third insulation layer 40 to enhance the flatness of the third insulation layer 40. For example, the third insulation layer 40 has a substantially level surface by a chemical mechanical polishing (CMP) process, an etch-back process, etc. The third insulation layer 40 can be formed using an organic material. For example, the third insulation layer 40 is formed of photoresist, acryl-based resin, polyimide-based resin, polyamide-based resin, siloxane-based resin, etc. These can be used alone or in a combination thereof. Alternatively, the third insulation layer 40 can be formed of an inorganic material. For example, the third insulation layer 40 is formed of silicon oxide, silicon nitride, silicon oxynitride, silicon oxycarbide, aluminum, magnesium, zinc, hafnium, zirconium, titanium, tantalum, aluminum oxide, titanium oxide, tantalum oxide, magnesium oxide, zinc oxide, hafnium oxide, zirconium oxide, titanium oxide, etc. These can be used alone or in a mixture thereof. The third insulation layer 40 can be formed by a spin coating process, a printing process, a sputtering process, a CVD process, an ALD process, a PECVD process, an HDP-CVD process or a vacuum evaporation process in accordance with ingredients included in the third insulation layer 40.

The circular display device according to the present example embodiment includes a plurality of circuit pattern formed in a peripheral area and along a boundary of a pixel area and the peripheral area. The circuit pattern has a first side extending along a fourth direction and a second side extending along a fifth direction which is substantially perpendicular to the fourth direction, so that the circuit pattern can be efficiently located along the peripheral area. Thus, the size of the peripheral area can be reduced.

In addition, the circuit patterns can be formed at substantially the same distance from the boundary between the pixel area and the peripheral area, resistance due to load resistive caused by scan or data line according to a location difference of pixels can be reduced, so that degradation of displaying quality can be reduced.

In addition, the circular display substrate according to the present example embodiment includes a plurality of pixels including a circular pixel formed in a pixel area and a driving portion configured to drive the pixels formed in a peripheral area adjacent to the pixel area. The driving portion can include a plurality of unit circuits repeatedly formed along the peripheral area. A layout of each of the unit circuits can extend toward a center of the circular display substrate. A distance between each of the unit circuit and a center of the pixel area can be substantially uniform.

Figure 4A:
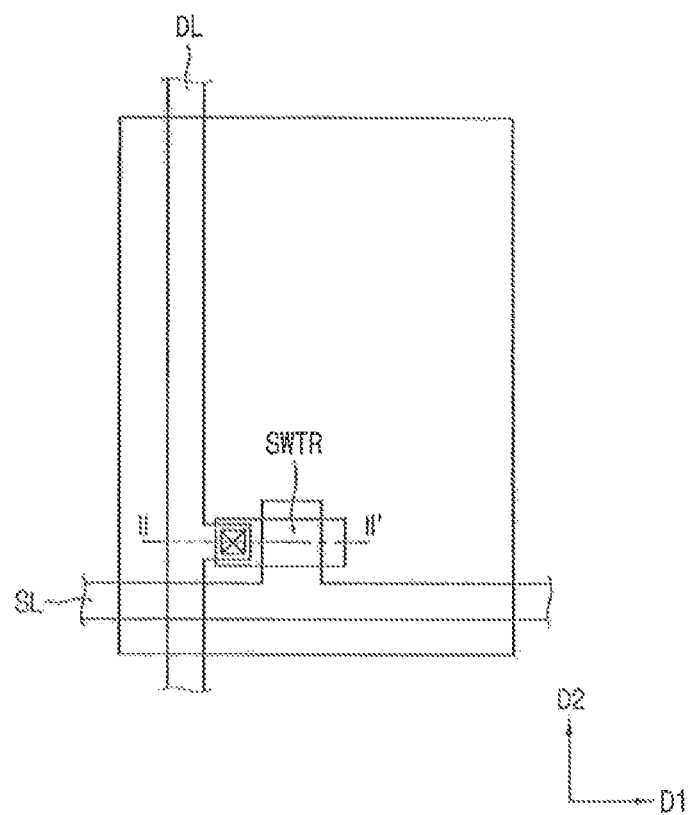
FIG. 4A is a partially enlarged view illustrating a pixel of FIG. 2.
Figure 4B:
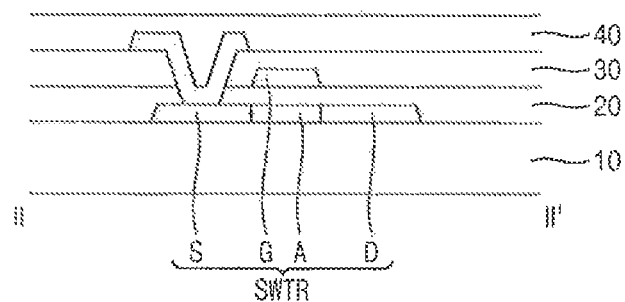
FIG. 4B is a cross-sectional view taken along line II-II' of FIG. 4A.

FIG. 4A is a partially enlarged view illustrating a pixel of FIG. 2. FIG. 4B is a cross-sectional view taken along line II-II' of FIG. 4A.

Referring to FIGS. 4A and 4B, the pixel P includes a data line DL, a scan line SL and a switching transistor SWTR.

A base substrate 10 can include a transparent insulation substrate. A buffer layer (not shown) can be further formed on the base substrate 10. An active pattern including a source are S, a drain area D and an active area A of the switching transistor SWTR can be formed on the base substrate 10. The first insulation layer 20 can be formed on and cover the active pattern. The scan line SL is formed on the base substrate 10 and can extend in a first direction D1. A second insulation layer 30 is formed on the first insulation layer 20 on which the scan line SL is formed. The data line DL is formed on the second insulation layer 30.

The data line DL can be electrically connected to the source area S of the switching transistor SWTR through a contact hole formed through the first and second insulation layers 20 and 30.

The third insulation layer 40 can be formed on the second insulation layer 30 on which the data line DL is formed.

Although not shown in the figures, the pixel P can further include a pixel electrode electrically connected to the drain area D of the switching transistor SWTR, an organic light-emitting layer formed on the pixel electrode, and a common electrode formed on the organic light-emitting layer.

In addition, although not shown in figures, the pixel P further include a pixel electrode electrically connected to the drain area D of the switching transistor SWTR, a liquid crystal layer formed on the pixel electrode, and a common electrode formed on the liquid crystal layer.

Referring again to FIGS. 3A and 4B, the scan line SL and the gate electrode G of the switching transistor SWTR in the pixel area, and the first pattern 112, the scan peripheral gate electrode SG of the scan peripheral transistor STR and the data peripheral gate electrode DG of the data peripheral transistor DTR in the peripheral area can be formed from the same metal layer by pattering the metal layer.

In addition, the data line DL in the pixel area and the second pattern 212 in the peripheral area can be formed from the same metal layer by pattering the metal layer.

Figure 5:
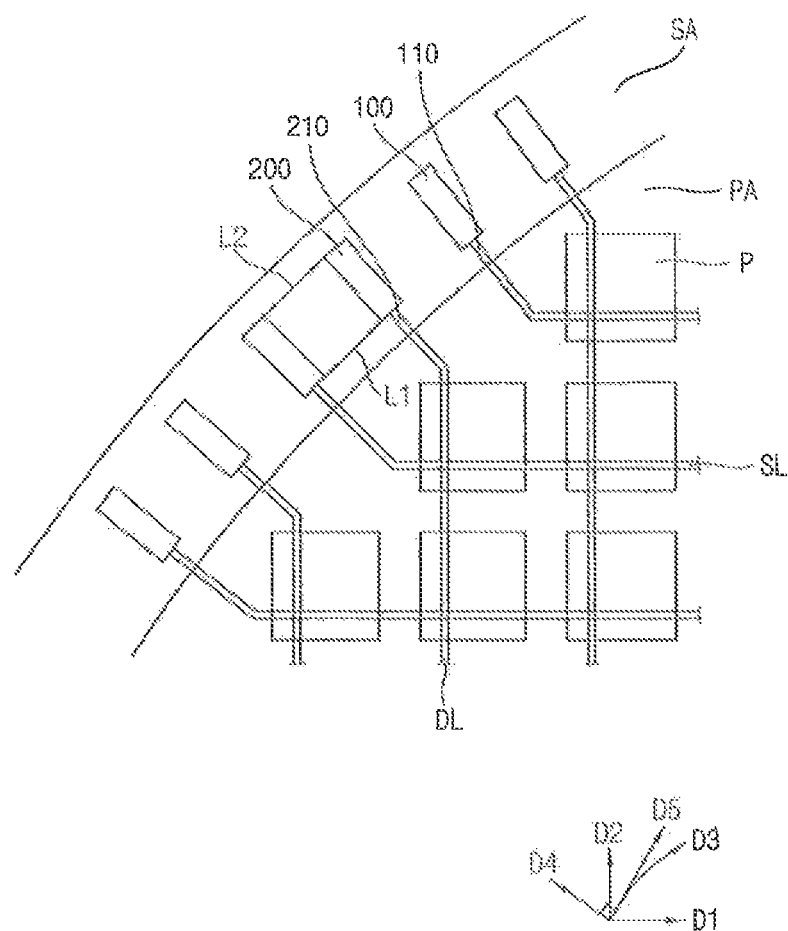
FIG. 5 is a partially enlarged view illustrating a circular display substrate according to an exemplary embodiment.

FIG. 5 is a partially enlarged view illustrating a circular display substrate according to an exemplary embodiment.

Referring to FIG. 5, a boundary between a pixel area PA and a peripheral area SA is substantially circular. Thus, a portion of the boundary can have an arc shape. The boundary is formed along an arc direction D3. A plurality of scan circuits 100 and data circuits 200 are formed along the arc direction D3. For example, the scan circuits 100 and the data circuits 200 are alternately formed along the arc direction D3. The scan circuit 100 and the data circuit 200 can be arranged at the substantially uniform distance. Thus, the distance between the scan circuit 100 and another scan circuit 100 which is adjacent to the scan circuit 100 can be substantially uniform. In addition, the distance between the data circuit 200 and another data circuit 200 which is adjacent to the data circuit 200 can be substantially uniform.

The scan circuit 100 extends in a fourth direction D4 which is substantially perpendicular to the arc direction D3. The fourth direction D4 is substantially perpendicular to the arc direction D3, so that the fourth direction D4 can be varied according to a position of the scan circuit 100. For example, the scan circuit 100 has a width in a fifth direction D5 which is substantially perpendicular to the fourth direction D4, and extend in the fourth direction D4, so that the scan circuit 100 is substantially rectangular.

The scan connecting line 110 is formed in the peripheral area SA. The scan connecting line 110 electrically connects the scan circuit 100 to the scan line SL in the pixel area PA. The scan connecting line 110 extends in the fourth direction D4. Thus, the scan connecting line 110 extends in a direction which is substantially perpendicular to the boundary between the pixel area PA and the peripheral area SA.

The data circuit 200 extends in the fourth direction D4 which is substantially perpendicular to the arc direction D3. The fourth direction D4 is substantially perpendicular to the arc direction D3, so that the fourth direction D4 can be varied according to a position of the data circuit 200. For example, the data circuit 200 has a width in a fifth direction D5, and extends in the fourth direction D4, so that the data circuit 200 is substantially rectangular.

The data connecting line 210 is formed in the peripheral area SA. The data connecting line 210 electrically connects the data circuit 200 to the data line DL in the pixel area PA. The data connecting line 210 extends in the fourth direction D4. Thus, the data connecting line 210 extends in a direction which is substantially perpendicular to the boundary of the pixel area PA and the peripheral area SA.

The data line DL and the scan line SL can be bent near the peripheral area SA.

Accordingly, the scan circuits 100 and the data circuits 200 are formed along the boundary between the pixel area PA and the peripheral area SA, and each of the scan circuits 100 and the data circuits 200 extends in a substantially perpendicular direction with respect to the boundary. Thus, efficiency of a circuit layout in peripheral area SA can be improved.

In addition, the scan connecting line 110 extends in the substantially perpendicular direction with respect to the boundary, so that the scan lines SL in the pixel area PA and the scan circuits 100 can be connected to each other uniformly. Thus, resistive load due to a wiring length difference can be reduced.

In addition, the data connecting line 210 extends in the substantially perpendicular direction with respect to the boundary, so that the data lines DL in the pixel area PA and the data circuits 200 can be connected to each other substantially uniformly. Thus, resistive load due to a wiring length difference can be reduced.

Figure 6:
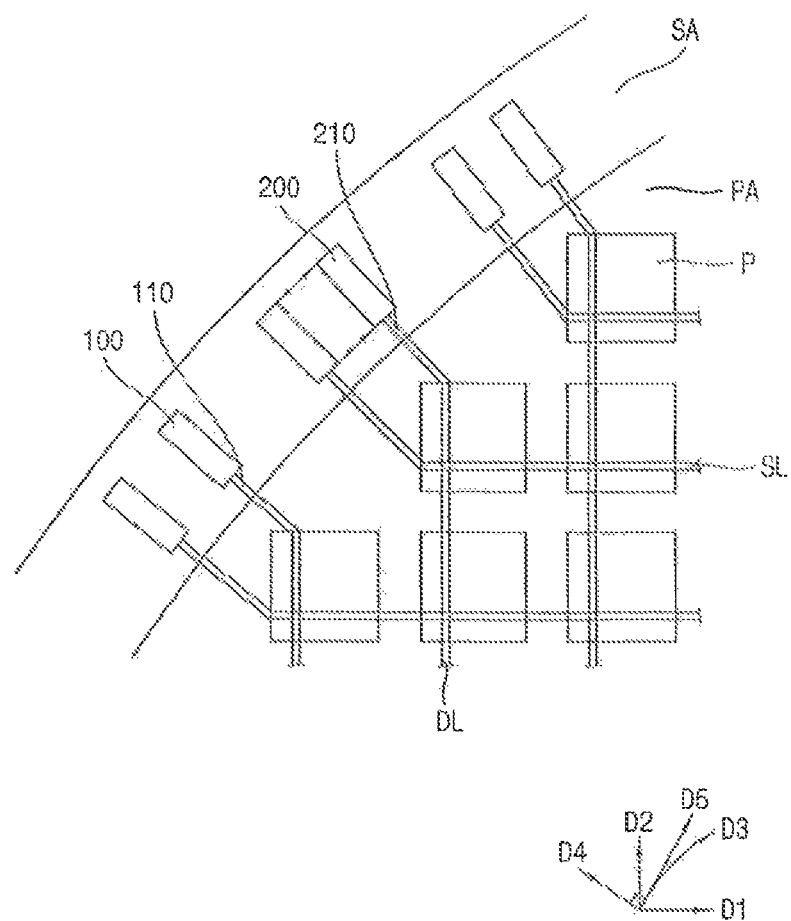
FIG. 6 is a partially enlarged view illustrating a circular display substrate according to an exemplary embodiment.

FIG. 6 is a partially enlarged view illustrating a circular display substrate according to an exemplary embodiment.

Referring to FIG. 6, a boundary between a pixel area PA and a peripheral area SA is substantially circular. Thus, a portion of the boundary can have an arc shape. The boundary is formed along an arc direction D3. A plurality of scan circuits 100 and data circuits 200 are formed along the arc direction D3. For example, the scan circuits 100 and the data circuits 200 are alternately formed along the are direction D3.

The scan circuit 100 extends in a fourth direction D4 which is substantially perpendicular to the arc direction D3. The fourth direction D4 is substantially perpendicular to the arc direction D3, so that the fourth direction D4 can be varied according to a position of the scan circuit 100. For example, the scan circuit 100 can overall have a width in a fifth direction D5 which is substantially perpendicular to the fourth direction D4, and extend in the fourth direction D4, so that the scan circuit 100 has a rectangular shape.

The scan connecting line 110 is formed in the peripheral area SA. The scan connecting line 110 electrically connects the scan circuit 100 to the scan line SL in the pixel area PA. The scan connecting line 110 extends in the fourth direction D4. Thus, the scan connecting line 110 extends in a direction which is perpendicular to boundary of the pixel area PA and the peripheral area SA.

In addition, the scan line SL in the pixel area PA extends form the scan connecting line 110 in the fourth direction D4 in which the scan connecting line 110 extends. Thus, the scan line SL can be bent near the pixel P.

The data circuit 200 extends in the fourth direction D4 which is substantially perpendicular to the are direction D3. The fourth direction D4 is substantially perpendicular to the arc direction D3, so that the fourth direction D4 can be varied according to a position of the data circuit 200. For example, the data circuit 200 has a width in a fifth direction D5, and extends in the fourth direction D4, so that the data circuit 200 has a rectangular shape.

The data connecting line 210 is formed in the peripheral area SA. The data connecting line 210 electrically connects the data circuit 200 to the data line DL in the pixel area PA. The data connecting line 210 extends in the fourth direction D4. Thus, the data connecting line 210 extends in a direction which is substantially perpendicular with respect to the boundary of the pixel area PA and the peripheral area SA.

In addition, the data line DL in the pixel area PA extends form the data connecting line 210 in the fourth direction D4 in which the data connecting line 210 extends. Thus, the data line DL can be bent near the pixel P.

Accordingly, the scan circuits 100 and the data circuits 200 are formed along the boundary between the pixel area PA and the peripheral area SA, and each of the scan circuits 100 and the data circuits 200 extends in a substantially perpendicular direction with respect to the boundary. Thus, efficiency of a circuit layout in peripheral area SA can be improved.

In addition, the scan connecting line 110 and the data connecting line 210 can be connected to the pixel P in a shortest path, so that resistive load due to a wiring length difference can be reduced.

Figure 7:
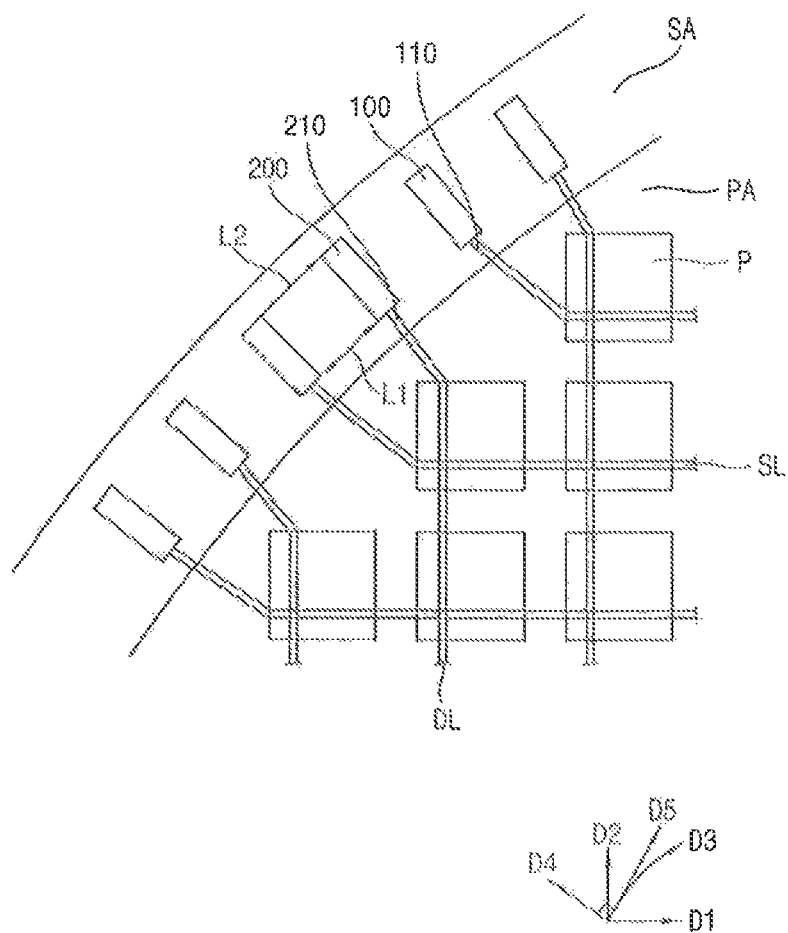
FIG. 7 is a partially enlarged view illustrating a circular display substrate according to an exemplary embodiment.

FIG. 7 is a partially enlarged view illustrating a circular display substrate according to an exemplary embodiment.

Referring to FIG. 7, a boundary of a pixel area PA and a peripheral area SA has a circular shape. Thus, a portion of the boundary can have an arc shape. The boundary is formed along an arc direction D3. A plurality of scan circuits 100 and data circuits 200 are formed along the arc direction D3. For example, the scan circuits 100 and the data circuits 200 are alternately formed along the arc direction D3. The scan circuit 100 and the data circuit 200 can be arranged at a substantially uniform distance. Thus, the distance between the scan circuit 100 and another scan circuit 100 which is adjacent to the scan circuit 100 can be substantially uniform. In addition, the distance between the data circuit 200 and another data circuit 200 which is adjacent to the data circuit 200 can be substantially uniform.

The scan circuit 100 extends in a fourth direction D4 which is substantially perpendicular to the arc direction D3. The fourth direction D4 is substantially perpendicular to the arc direction D3, so that the fourth direction D4 can be varied according to a position of the scan circuit 100. For example, the scan circuit 100 has a width in a fifth direction D5 which is substantially perpendicular to the fourth direction D4, and extends in the fourth direction D4, so that the scan circuit 100 is substantially rectangular.

The scan connecting line 110 is formed in the peripheral area SA. The scan connecting line 110 electrically connects the scan circuit 100 to the scan line SL in the pixel area PA. A portion of the scan line SL adjacent to the peripheral area SA and the scan connecting line 110 extends in a straight line from the scan circuit 100 to the pixel P. Thus, the portion of the scan line SL and the scan connecting line 110 extend in a shortest path the from scan circuit 100 to the pixel P which is adjacent to the peripheral area SA.

The data circuit 200 extends in the fourth direction D4 which is substantially perpendicular to the arc direction D3. The fourth direction D4 is substantially perpendicular to the are direction D3, so that the fourth direction D4 can be varied according to a position of the data circuit 200. For example, the data circuit 200 has a width in a fifth direction D5, and extends in the fourth direction D4, so that the data circuit 200 is substantially rectangular.

The data connecting line 210 is formed in the peripheral area SA. The data connecting line 210 electrically connects the data circuit 200 to the data line DL in the pixel area PA. A portion of the data line DL adjacent to the peripheral area SA and the data connecting line 210 extends in a substantially straight line from the data circuit 200 to the pixel P. Thus, the portion of the data line DL and the data connecting line 210 extend in a shortest path the from data circuit 200 to the pixel P which is adjacent to the peripheral area SA.

Accordingly, the data line DL and the scan line SL can be bent near the pixel P.

Accordingly, the scan circuits 100 and the data circuits 200 are formed along the boundary between the pixel area PA and the peripheral area SA, and each of the scan circuits 100 and the data circuits 200 extends in a substantially perpendicular direction with respect to the boundary. Thus, efficiency of a circuit layout in peripheral area SA can be improved.

In addition, the scan circuit 100 and the data circuit 200 can be connected to the pixel P in the shortest path, so that resistive load due to a wiring length difference can be reduced.

Figure 8:
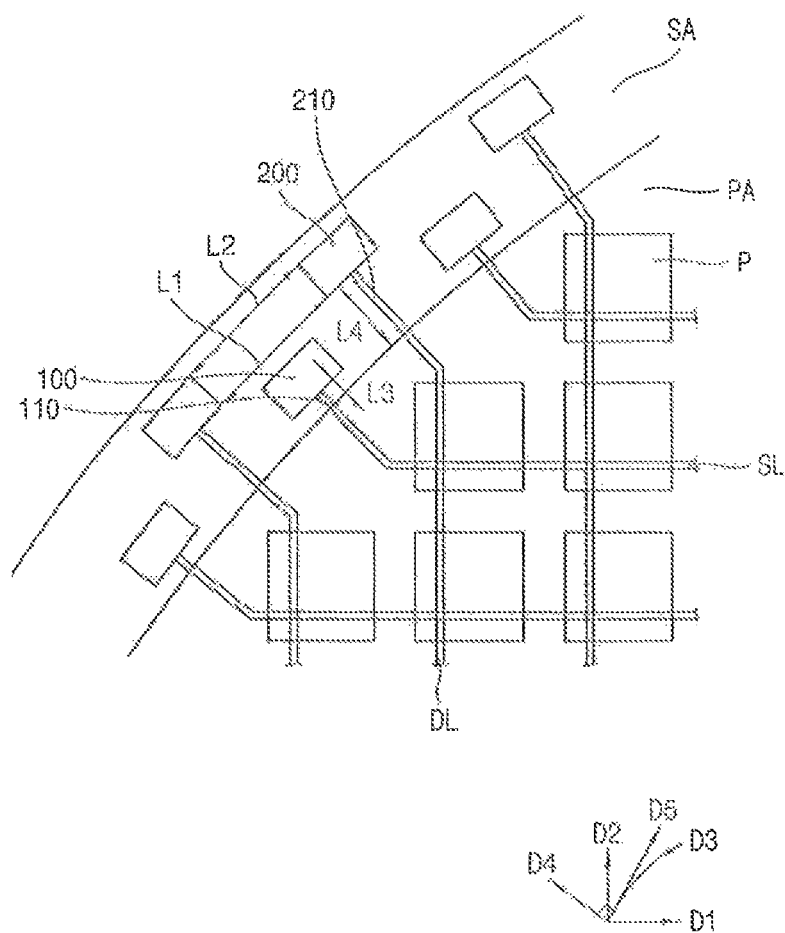
FIG. 8 is a partially enlarged view illustrating a circular display substrate according to an exemplary embodiment.

FIG. 8 is a partially enlarged view illustrating a circular display substrate according to an exemplary embodiment.

Referring to FIG. 8, a circular display substrate is substantially same as a circular display substrate of FIGS. 2 and 5 to 7, expect that scan and data circuits are arranged in two rows in a plan view.

A scan circuit 100 is formed spaced apart form a boundary between a pixel area PA and a peripheral area SA by a third distance D3, and a data circuit 200 is formed spaced apart from the boundary by a fourth distance L4. The third distance L3 can be less than the fourth distance LA.

Accordingly, efficiency of circuit layout in the peripheral area SA can be improved, so that size of the peripheral area SA can be reduced.

Figure 9:
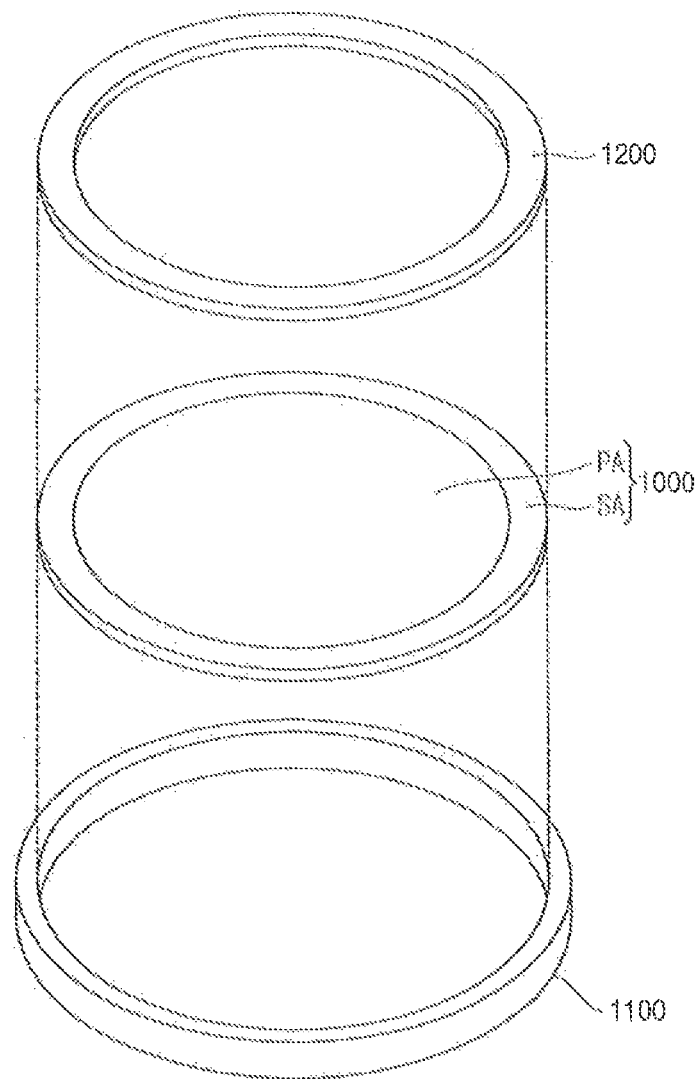
FIG. 9 is an exploded perspective view briefly illustrating a circular display according to an exemplary embodiment.

FIG. 9 is an exploded perspective view briefly illustrating a circular display device according to an exemplary embodiment.

Referring to FIG. 9, a circular display device includes a lower receiving container 1100, a circular display panel 1000, and an upper receiving container 1200.

The lower receiving container 1100 and the upper receiving container 1200 receive the circular display panel 1000.

The circular display panel 1000 is received in the lower and upper receiving containers 1100 and 1200, and displays an image. The circular display panel 1000 can include a circular display of FIGS. 1 and 5 to 8. The circular display panel 1000 includes a pixel area PA in which the image is formed, and a peripheral area SA surrounding the pixel area PA. For example, the circular display panel 1000 is an OLED display panel.

The upper receiving container 1200 and the lower receiving container 1100 receive the circular display panel 1000. The upper receiving container 1200 covers the peripheral area SA of the circular display panel 1000, so that the peripheral area SA is not seen from the outside.

Figure 10:
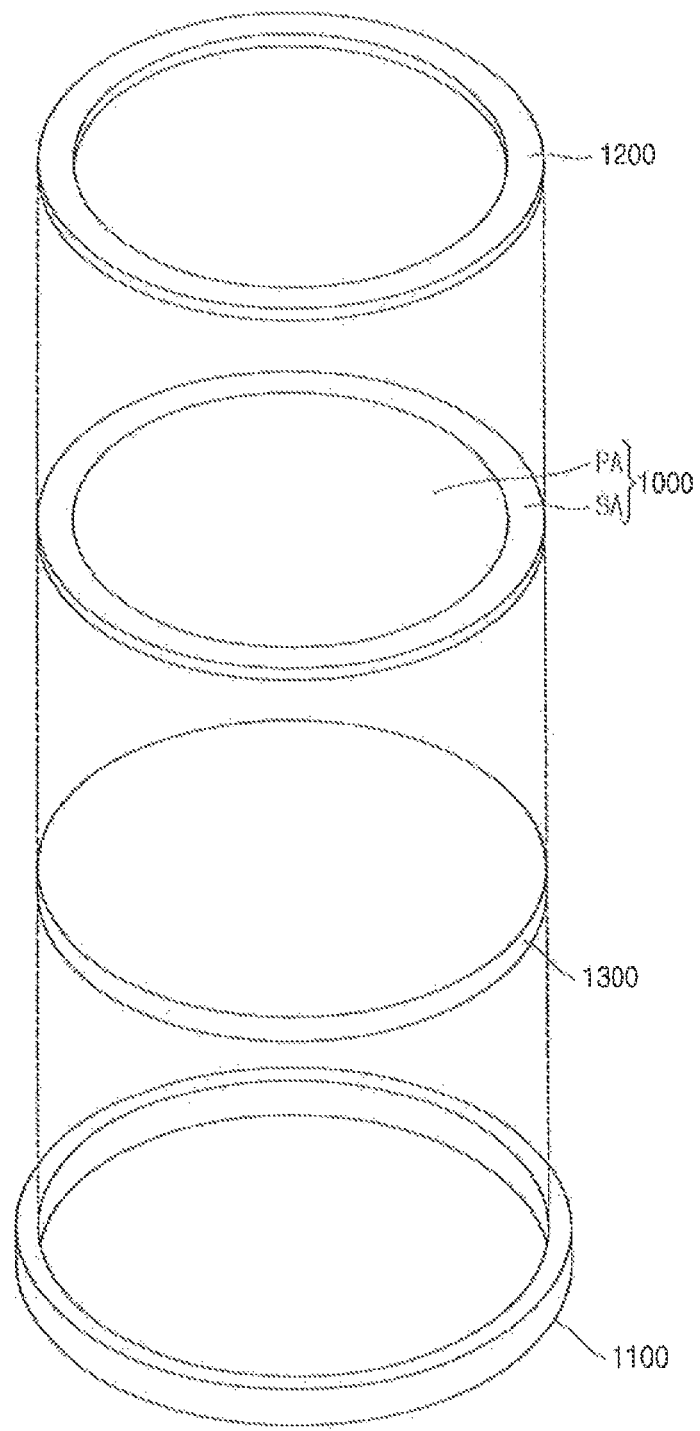
FIG. 10 is an exploded perspective view briefly illustrating a circular display according to an exemplary embodiment.

FIG. 10 is an exploded perspective view briefly illustrating a circular display device according to an exemplary embodiment.

Referring to FIG. 10, a circular display device includes a lower receiving container 1100, a circular display panel 1000, a backlight assembly 1300 and an upper receiving container 1200.

The lower receiving container 1100 and the upper receiving container 1200 receive the circular display panel 1000 and the backlight assembly 1300.

The circular display panel 1000 is received in the lower and upper receiving containers 1100 and 1200, and displays an image. The circular display panel 1000 can include a circular display of FIGS. 1 and 5 to 8. The circular display panel 1000 includes a pixel area PA in which the image is formed, and a peripheral area SA surrounding the pixel area PA. For example, the circular display panel 1000 is a liquid crystal display panel.

The backlight assembly 1300 is formed under the circular display panel 1000, and provides light to the circular display panel 1000.

The upper receiving container 1200 and the lower receiving container 1100 receive the circular display panel 1000. The upper receiving container 1200 covers the peripheral area SA of the circular display panel 1000, so that the peripheral area SA is not seen from the outside. Thus, the upper receiving container 1200 overlaps the peripheral area SA The described technology can be applied to an OLED display and an electronic device having the OLED display. For example, the described technology is applied to computer monitors, televisions, laptop computers, digital cameras, cellular phones, smartphones, smart pads, personal digital assistants (PDAs), portable multimedia players (PMPs), MP3 players, navigation systems, video phones, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the inventive technology. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A display substrate comprising:
    a plurality of pixels arranged in a substantially circular pixel area;
    a driving circuit comprising a plurality of scan circuits, the driving circuit formed in a peripheral area surrounding the pixel area and configured to drive the pixels;
    a plurality of scan lines formed in the substantially circular pixel area, wherein the scan lines extend in a first direction; and
    a plurality of scan connecting lines each formed between each of the scan circuits and each of the scan lines and each configured to electrically connect each of the scan lines to each of the scan circuits,
    wherein at least two of angles between the first direction and each of extending directions of the scan connecting lines are different from each other, and
    wherein at least two of the angles are substantially equal to each other.

2. The display substrate of claim 1, wherein a boundary is formed between the pixel area and the peripheral area, and
    wherein the driving circuit comprises a conductive pattern having a first side which extends in a peripheral direction crossing the boundary, wherein the pixels include a plurality of boundary pixels formed immediately adjacent to the boundary, and wherein the conductive pattern is bent and crosses the boundary pixels.

3. The display substrate of claim 2, wherein the scan circuits comprise first to third scan circuits which are arranged in order with being adjacent to each other,
    the first scan circuit comprises a first scan pattern electrically connected to a first pixel and extends in a third direction in the peripheral area,
    the second scan circuit comprises a second scan pattern electrically connected to a second pixel and extends in a fourth direction in the peripheral area,
    the third scan circuit comprises a third scan pattern electrically connected to a third pixel and extends in a fifth direction in the peripheral area,
    wherein the third direction, the fourth direction and the fifth direction are different from each other, and wherein the third direction is a direction which is perpendicular to the boundary at the first scan circuit is formed, the fourth direction is a direction which is perpendicular to the boundary at the second scan circuit is formed, and the fifth direction is a direction which is perpendicular to the boundary at the third scan circuit is formed.

4. The display substrate of claim 2, wherein the scan lines and the conductive pattern are formed on the same layer.

5. The display substrate of claim 4, wherein the driving circuit further comprises a plurality of data circuits,
wherein each of the data circuits comprises a second pattern electrically connected to a selected pixel and has first and second sides connected to each other,
wherein the first side of the second pattern extends in the peripheral direction, and
wherein the second side of second pattern extends perpendicular to the peripheral direction.

6. The display substrate of claim 5, further comprising:
a plurality of data lines formed in the pixel area, wherein the data lines extend in a second direction which is substantially perpendicular to the first direction; and
a plurality of data connecting lines each formed between each of the data circuits and each of the data lines and each configured to electrically connect each of the data lines to each of the data circuits,
wherein at least two angles between the second direction and each of extending directions of the data connecting lines are different from each other, and
wherein at least two of the angles are substantially equal to each other.

7. The display substrate of claim 6, wherein the data lines and the second pattern are formed on the same layer.

8. The display substrate of claim 1, wherein the peripheral area forms a ring around the pixel area.

9. The display substrate of claim 1, wherein the pixels are formed in a completely circular pixel area.

10. The display substrate of claim 2, wherein the conductive pattern crosses and is perpendicular to a circular portion of the boundary.

11. The display substrate of claim 2, wherein the conductive pattern crosses each and every one of the boundary pixels.

12. A display substrate comprising:
a plurality of pixels arranged in a substantially circular pixel area;
a driving circuit formed in a peripheral area surrounding the pixel area and configured to drive the pixels, the driving circuit comprising a scan circuit and a data circuit alternatively arranged;
a scan line formed in the substantially circular pixel area, wherein the scan line extends in a first direction;
a data line formed in the substantially circular pixel area, wherein the data line extends in a second direction substantially perpendicular to the first direction;
a scan connecting line formed between the scan circuit and the scan line and configured to electrically connect the scan line to the scan circuit; and
a data connecting line formed between the data circuit and the data line and configured to electrically connect the data line to the data circuit,
wherein an angle between the first direction and an extending direction of the scan connecting line is different from an angle between the second direction and an extending direction of the data connecting line.

13. The display substrate of claim 12, wherein the extending direction of the scan connecting line is nonparallel to the extending direction of the data connecting line.

* * * * *